Figure 1:
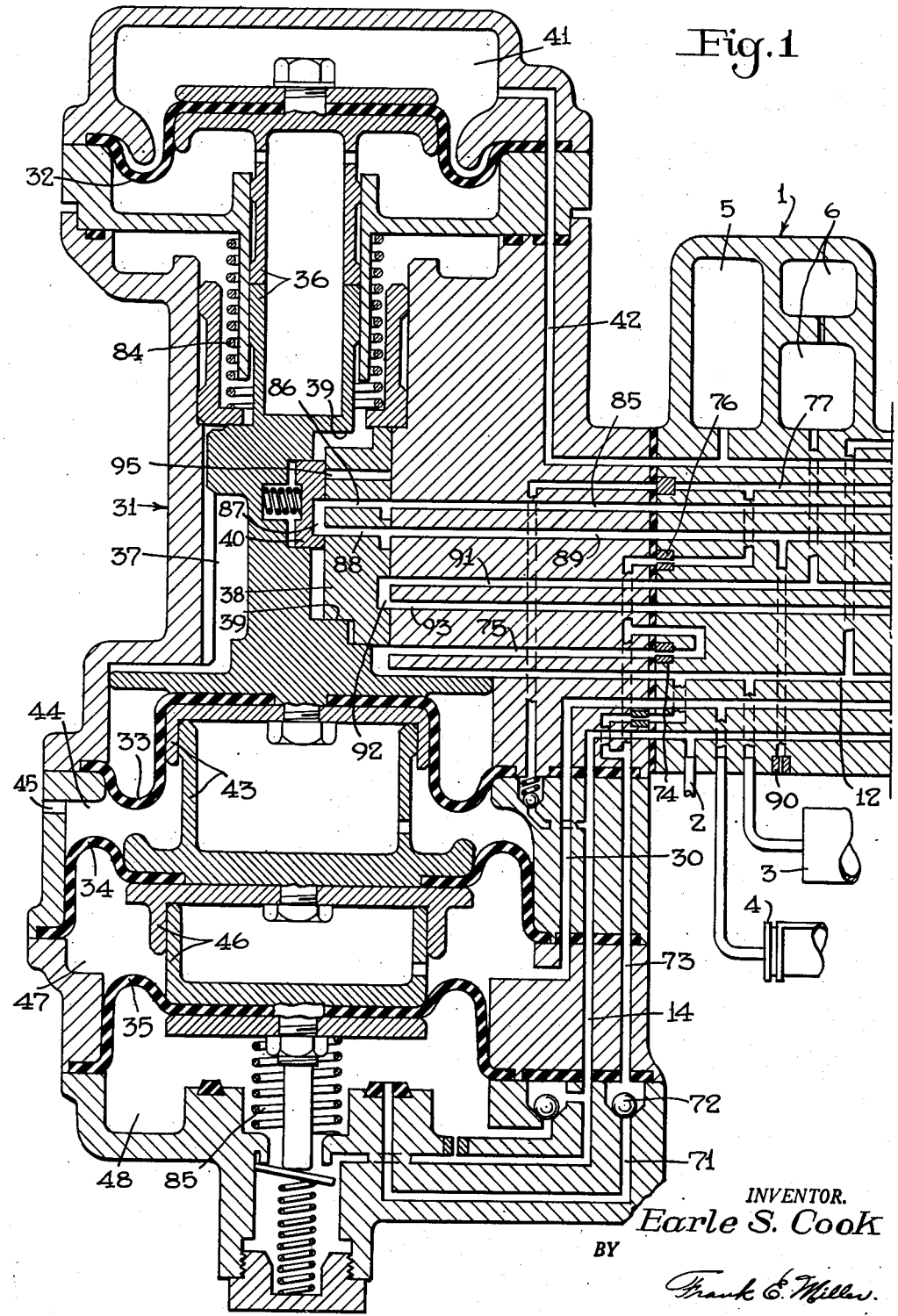

INVENTOR.
Earle S. Cook
BY
Frank E. Miller
ATTORNEY

Patented Mar. 16, 1954

2,672,376

UNITED STATES PATENT OFFICE 2,672,376

FLUID PRESSURE BRAKE APPARATUS

Earle S. Cook, Forest Hills, Pa., assignor to Westinghouse Air Brake Company, a corporation of Pennsylvania Application March 26, 1951, Serial No. 217,557

8 Claims. (Cl. 303—60)

This invention relates to fluid pressure brake apparatus and more particularly to the railway type adapted to be controlled by variations in pressure in a brake pipe.

In my pending application, Serial No. 201,846, filed December 20, 1950, there is disclosed a fluid pressure brake apparatus embodying a pile of connected flexible diaphragms controlled by pressure of fluid in a control reservoir acting in opposition to pressure in the usual brake pipe and brake cylinder device for controlling application and release of brakes on a railway car in response to variations in pressure in said brake pipe relative to pressure of fluid in said reservoir which latter pressure it is desired remain substantially constant while an application of brakes is in effect.

The brake apparatus also embodies a quick service valve device adapted to respond to a certain light reduction in brake pipe pressure to transmit the reduction to the next car of a train in the usual manner and also to make a sufficient local reduction in brake pipe pressure to cause operation of said pile of diaphragms by control reservoir pressure, as above described, to initiate the application of brakes.

In the above referred to apparatus, the control reservoir is formed within a pipe bracket and is of maximum volume consistent with a practical size of bracket. However, it has been found that displacement of the diaphragm which is subject to control reservoir pressure as it moves in response to a reduction in brake pipe pressure to initiate an application of brakes, increases, in effect, the volume of the control reservoir and thereby reduces the pressure therein to such an extent as to undesirably delay such response and thereby the initiation of the brake application. The reduced control reservoir pressure also results in a lower brake application than intended for a chosen reduction in brake pipe pressure or, on the other hand, requires a greater reduction in brake pipe pressure than intended to obtain a chosen degree of brake application. Obviously, therefore, any reduction in control reservoir pressure below the degree existing at the time of initiating an application of brakes is undesirable, and the principal object of the invention is the provision of means for preventing any material reduction in control reservoir pressure, as above described, while effecting an application of brakes.

According to this object, I provide a communication between the auxiliary reservoir, which is of relatively large volume as compared to the control reservoir and charged to the same pressure as in the brake pipe and control reservoir when the brakes are released, and the control reservoir which permits pressure of fluid to flow from the auxiliary reservoir to the control reservoir as the pressure in the latter tends to reduce upon movement of the diaphragm pile in response to a reduction in brake pipe pressure, whereby the pressure in the control reservoir will remain substantially at the desired degree in order to ensure desired response of the diaphragm pile to a reduction in brake pipe pressure and a desired degree of brake application for a chosen reduction in brake pipe pressure. A check valve in this communication prevents back flow of fluid under pressure from the control reservoir to the auxiliary reservoir as the pressure in the latter is subsequently reduced by flow to the brake cylinder device after movement of the diaphragm pile to the position to permit such flow.

In a brake apparatus of this type, it is desired that fluid under pressure in the control reservoir be tightly bottled up while an application of brakes is in effect since the pressure of such fluid controls the degree of brake application, and therefore leakage of fluid under pressure from said reservoir would result in a corresponding loss in brake application. In the above apparatus, there is already a manually operated check valve for releasing fluid under pressure from the control reservoir and it is undesirable to have any more valve controlled communications from the control reservoir than absolutely necessary since the possibility of leakage of fluid under pressure from the control reservoir will correspondingly increase. According to the invention, therefore, I accomplish the above feature of maintaining the pressure in the control reservoir by flow from the auxiliary reservoir upon effecting an application of brakes, by a rearrangement of the manually operated check valve just mentioned without loss of its original purpose and hence without requiring an additional check valve. The manually operated check valve heretofore was arranged to control a communication from the control reservoir directly to atmosphere, but according to the invention, it is arranged to permit flow of fluid under pressure from the auxiliary reservoir to the control reservoir but to prevent back flow unless manually opened at which time back flow will occur to the auxiliary reservoir so as to permit dissipation of the pressure in the control reservoir along with that from the auxiliary reservoir upon complete venting of the apparatus.

Other objects and advantages will become apparent from the following more detailed description of the invention.

Figure 2:
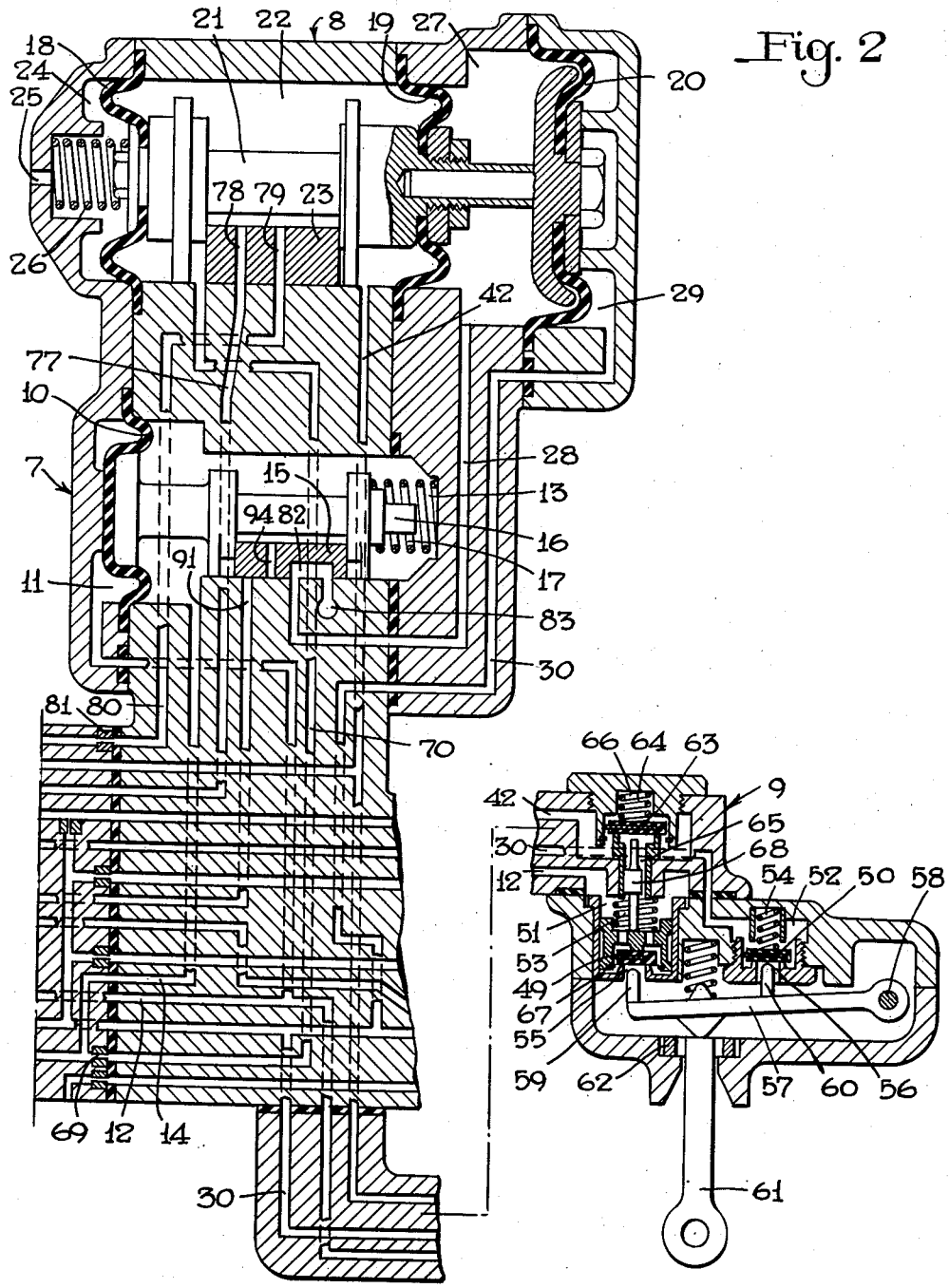

In the accompanying drawing, Figs. 1 and 2, when the right-hand edge of Fig. 1 is matched to the left-hand edge of Fig. 2, is a diagrammatic view of a fluid pressure brake apparatus embodying the invention.

Description

In the drawing, the invention is shown associated with a brake apparatus which may be substantially the same as that disclosed in my above mentioned pending application in view of which the following description of such apparatus will be limited to only such parts and their operation as necessary to an understanding of the invention.

As shown in the drawing, reference numeral 1 designates a pipe bracket to which are connected the usual brake pipe 2, a supply reservoir 3 and brake cylinder device 4 and which contains a control reservoir 5 and quick service reservoirs 6.

Mounted on one face of the pipe bracket is a quick service valve device 7, a charging valve device 8 and a manually operative release valve device 9 embodying the invention.

The quick service valve device comprises a flexible diaphragm 10 at one side of which is a chamber 11 open through a passage 12 to the supply reservoir 3 while at the opposite side is a chamber 13 open through a passage 14 to brake pipe 2. A slide valve 15 contained in chamber 13 is connected to the diaphragm 10 by a stem 16 which is subject to pressure of a spring 17 acting in conjunction with brake pipe pressure in chamber 13.

The charging valve device 8 comprises three flexible diaphragms 18, 19 and 20, the diaphragms 18, 19 being of the same area and smaller than diaphragm 20. The diaphragms 18 and 19 are spaced apart by a connecting stem 21 disposed in a chamber 22 formed between said diaphragms and operatively connected to a slide valve 23 contained in said chamber. At the opposite side of diaphragm 18 is a chamber 24 open to atmosphere through a port 25 and containing a spring 26 acting on stem 21 for urging said stem, the diaphragms 18 and 19 and thereby the slide valve 23 to the position in which they are shown in the drawing. At the opposite side of diaphragm 19 and thereby between diaphragms 19 and 20 is a chamber 27 connected by a passage 28 to the seat of the quick service slide valve 15. At the opposite side of diaphragm 20 is a chamber 29 open to a passage 30 connected to the brake cylinder device 4.

Mounted on another face of pipe bracket 1 is a brake application and release control valve device 31 which comprises a pile of four coaxially arranged and spaced apart diaphragms 32, 33, 34 and 35 of which 32, 33 and 35 are of substantially the same area while diaphragm 34 is of greater area. The diaphragms 32 and 33 are connected to each other by stem means 36 extending through a chamber 37 to which the supply reservoir 3 is constantly open via passage 12. A main slide valve 38 mounted on a seat in chamber 37 is disposed between two spaced shoulders 39 on the stem means 36 while an auxiliary slide valve 40 is mounted on the main slide valve 38 and disposed in a recess in stem means 36 for movement therewith. At the opposite side of diaphragm 32 is a control chamber 41 in constant communication with the control reservoir 5 and chamber 22 in the charging valve device 8 via passage 42.

The diaphragms 33 and 34 are connected to each other by spacer means 43 contained in a chamber 44 which is open to atmosphere through a vent 45. Similar spacer means 46 in a chamber 47 connect diaphragms 34, 35. Chamber 47 is open via passage 30 to the brake cylinder device 4 and to the seat of the main slide valve 38. At the opposite side of diaphragm 35 is a chamber 48 to which passage 14 and thereby the brake pipe 2 are connected.

The manually operative release valve device 9 comprises two check valves 49, 50 arranged side by side in chambers 51, 52 which are open to the supply reservoir and brake cylinder passages 12 and 30, and are operative upon unseating against seating springs 53 and 54 to vent the supply reservoir 3 and brake cylinder device 4, via vent openings 55 and 56, respectively. For thus unseating the check valves, a lever 57 extending beneath said check valves and pivoted at one end on a pin 58 has two fingers 59, 60 adapted upon turning said lever clockwise to pass through the openings 55, 56 and engage the check valves 49 and 50, respectively, to move them from their seats. A manually operative lever 61 depending from the casing of the release valve device is provided within the casing with a perforated disc like head 62 engaged on the side opposite said lever by a boss on lever 57. Upon movement of lever 61 out of the vertical, the head 62 is adapted to rock about its edge to thereby lift the connected part of lever 57 for actuating same to unseat first the check valve 50 and then the check valve 49.

According to the invention a relatively large area check valve 63 is disposed in a chamber 64 above the check valve 49 and in coaxial relation therewith. Chamber 64 is open to passage 42 and thence the control reservoir 5 and control diaphragm chamber 41. The check valve 63 controls communication between chamber 64 and a casing bore 65 leading to chamber 51 and thereby constantly open to the supply reservoir 3. A spring 66 in chamber 64 acts on the check valve 63 to urge it to a closed position. As above mentioned, the check valve 63 is relatively large to control a correspondingly large communication between chambers 51 and 64 and thus between the supply reservoir 3 and control reservoir 5, and the pressure of spring 66 on said check valve is the very minimum required to move said valve to its seat, whereby upon a reduction in pressure of fluid in chamber 64, as will be later described, said check valve will be opened by pressure of fluid in chamber 51 by a very slight differential between such pressures.

The check valve 49 is contained in a cage 67 slidably mounted in a suitable bore in the casing and a plunger 68 slidably mounted in the casing bore 65 is supported at one end on said cage. With the check valve 49 seated, the other end of plunger 68 will be spaced from check valve 63, but upon sufficient movement of lever 61 and after the check valve 49 is unseated the plunger 68 will be operated by cage 67 to unseat the check valve 63.

Operation

When the brake apparatus is void of fluid under pressure all parts will assume the position in which they are shown in the drawing. To initially charge the apparatus, fluid under pressure will be supplied to brake pipe 2 from whence it will flow via passage 44 to diaphragm chamber 48 in the control valve device 31, to valve chamber 13 in the quick service valve device 7 and through a choke 69 and a passage 70 to valve chamber 22 in the charging valve device 8.

Fluid under pressure supplied from the brake pipe 2 to diaphragm chamber 48 will flow through a passage 71, past a check valve 72 to a passage 73 and thence through a choke 74 to passage 75 leading to slide valve chamber 37 in the control valve device 31, and also from passage 73 through a choke 76, passage 77 and a port 78 in the charging slide valve 23 to the charging valve chamber 22. Fluid under pressure thus supplied to slide valve chamber 37 will flow to the supply reservoir passage 12 and at the same time fluid under pressure will also flow to said passage from valve chamber 22 in the charging valve device 8 through a port 79 in the slide valve 23, a passage 80 and a choke 81 and fluid thus supplied to passage 12 will flow to the supply reservoir 3, to check valve chamber 51 in the release valve device 9 and to the diaphragm chamber 11 in the quick service valve device 7 charging said reservoir and chambers to brake pipe pressure.

In the quick service valve device 7, the build up in brake pipe pressure in chamber 13 will lead the increase in supply reservoir pressure in chamber 11 and even finally upon equalization of such pressure the spring 17 will hold the parts thereof in their normal position, in which they are shown in the drawing, and in which chamber 27 in the charging valve device 8 will be vented via passage 28, a cavity 82 in the quick service slide valve 15 and an atmospheric vent port 83. With chamber 27 thus vented, the parts of the charging valve device 8 will remain in the position in which they are shown in the drawing due to pressure of spring 23, while initially charging the apparatus.

As fluid under pressure is supplied to valve chamber 22 of the charging valve device 8 as above described, fluid under pressure from said valve chamber will flow through passage 42 to the control reservoir 5, the control reservoir chamber 41 in the control valve device 31 and to check valve chamber 64 in the release valve device 9, charging said reservoir and chambers to the same pressure as in the brake pipe 2 and auxiliary reservoir 3.

In the control valve device 31, it will be noted that supply reservoir pressure in valve chamber 37 acts in one direction on diaphragm 32 and in the opposite direction on diaphragm 33 of the same area as diaphragm 32 creating opposing but balanced forces. Also brake pipe pressure in chamber 48 acting on diaphragm 35 will balance the opposing control reservoir pressure in chamber 41 acting on the same area diaphragm 32 when the control reservoir 5 becomes fully charged with fluid at the pressure in the brake pipe. With these latter forces thus balanced, the parts of the control valve device 31 will assume a normal or brake release position under the opposing biasing forces of springs 84 and 85.

With the auxiliary slide valve 40 and main slide valve 38 of the control valve device 31 in brake release position, the brake cylinder device 4 and diaphragm chamber 47 in said control valve device are both vented to atmosphere via passage 85, a port 86 in said main slide valve 38, a cavity 87 in said auxiliary slide valve, a port 88 in said main slide valve, a passage 89 and a brake release choke 90. Also the quick service reservoirs 6 are both vented via passage 91, a cavity 92 in the main slide valve 38 and a passage 93. Passage 91 leads to the seat of the quick service slide valve 15 which laps it in the normal position of said slide valve.

With the supply reservoir 3 and control reservoir 5 charged to the same pressure as in the brake pipe, it will be noted, that in the release valve device 9, the check valve 63 will be seated by spring 66. Also both other check valves 49 and 50 will be seated by their respective springs 53, 54 with lever 61 depending, as shown in the drawing.

With the brake apparatus charged and the brake cylinder device 4 vented, as above described, if it is desired to effect an application of brakes, a reduction in pressure will be initiated in the brake pipe 2 by operation of an engineer's brake valve device (not shown) in the usual manner. When the brake pipe pressure in valve chamber 13 of the quick service valve device 7 is thus reduced slightly, for example four tenths of a pound, below supply reservoir pressure in chamber 11, a force will be established on diaphragm 10 which will promptly deflect same against spring 17 and move the slide valve 15 to a quick service position.

In quick service position of the slide valve 15 a port 94 will register with passage 28 to permit fluid under pressure to flow from the brake pipe to diaphragm chamber 27 in the charging valve device 8 to provide a force which will deflect the diaphragms 19 and 18 against spring 26 and thereby move the slide valve 23 to a position for lapping the brake pipe passage 70, the supply reservoir passage 80 and passage 77 thereby closing the charging communication to the supply and control reservoirs 3 and 5, respectively, for preventing back flow of fluid from said reservoirs to the brake pipe and for also isolating said reservoirs from each other at this point.

Also in quick service position of the quick service slide valve 15, passage 91 is opened to valve chamber 13 whereupon fluid under pressure from the brake pipe will rapidly flow through said chamber to said passage and thence through cavity 92 in the main slide valve 38 and passage 93 to atmosphere to effect a quick service reduction in pressure in the brake pipe to transmit the reduction in brake pipe pressure to the next car of a train to the rear and thus serially throughout the train, in the usual manner.

When by operation of the quick service valve device 7 the brake pipe pressure in diaphragm chamber 48 becomes sufficiently reduced below the bottled up control reservoir pressure in chamber 41, the latter pressure will move the pile of diaphragms downwardly. It is intended that the diaphragm pile move downwardly when the brake pipe pressure in chamber 48 is reduced two to three pounds below the control reservoir pressure in chamber 41, but in case such fails to materialize, it will be noted that by operation of the quick service valve device 7, brake pipe pressure will continue to reduce until the diaphragm pile does move.

As the diaphragm pile thus moves down, it will initially move the auxiliary slide valve 40 relative to the main slide valve 38 to close communication between ports 86 and 88 in the main slide valve for thereby disconnecting the brake cylinder device 4 from the brake cylinder release passage 89, and said movement will also uncover a port 95 in the main slide valve 38. Continued movement of the diaphragms will then move the main slide valve 38 downward due to contact between said valve and the upper shoulder 39 on the stem means 36 until an application position is reached in which port 95 registers with the brake cylinder passage 85. Fluid under pressure from valve chamber 37 and the connected supply reservoir 3 will then flow to passage 85 and thence to the brake cylinder device 4 for applying the brakes on the car. As fluid under pressure is thus supplied to the brake cylinder device 4 the pressure of such fluid will become effective in chamber 47 acting in one direction on diaphragm 33 and in the opposite direction on the larger diaphragm 34.

In application position of the main slide valve 38, passage 91 is lapped by said slide valve to prevent further quick service venting of fluid under pressure from the brake pipe to atmosphere. However, after this occurs fluid under pressure will continue to be vented from the brake pipe to the quick service reservoirs 6 until said reservoirs are charged with fluid equal to brake pipe pressure thereby providing a chosen reduction in brake pipe pressure after movement of the control valve device to application position to ensure a chosen degree of brake application on the car.

Now assuming that the reduction in brake pipe pressure terminates upon equalization into the quick service reservoirs 6, then when the pressure obtained in the brake cylinder device 4 and diaphragm chamber 47 becomes increased by flow from the supply reservoir sufficiently with respect to reduced brake pipe pressure in chamber 48 to overbalance the controlling force of control reservoir pressure in chamber 41 acting on diaphragm 32, the diaphragm pile will be moved upward and shift the auxiliary slide valve 40 relative to the main slide valve 38 to lap port 95 thereby terminating supply of fluid under pressure to the brake cylinder device 4 and hence increase in pressure in diaphragm chamber 47, whereupon movement of the diaphragm pile will cease in an application lap position defined by contact between diaphragm stem means 36 and the lower end of main slide valve 38.

If by operation of the engineer's brake valve device (not shown) a further reduction in pressure is effected in brake pipe 2 and diaphragm chamber 48, the diaphragm pile will move the auxiliary slide valve 40 again to application position. Fluid under pressure will then again flow through the application port 95 to the brake cylinder device 4 and diaphragm chamber 47 until the brake cylinder pressure is increased in accordance with the further reduction in brake pipe pressure whereupon the auxiliary slide valve 40 will again be moved to lap position to limit the degree of brake application according to the further reduction in brake pipe pressure.

In this manner an application of brakes may be graduated on in proportion to successive steps of reduction in pressure in brake pipe 2, the quick service valve device 7 operating only in response to the initial reduction in brake pipe pressure.

It is to be noted that the pressure of fluid obtained in the brake cylinder device 4 and diaphragm chamber 47 is limited according to the degree of brake pipe reduction by the bottled-up pressure in the control reservoir 5 and control diaphragm chamber 41. It will be further noted that downward movement of diaphragm 32 in effecting an application of brake increases the volume of chamber 41 tending to permit the pressure in said chamber and reservoir to reduce below that initially provided which was equal to normal brake pipe pressure and which it is desired to be constantly effective in chamber 41 in and after effecting an application of brakes.

If the control reservoir pressure in chamber 41 were thus permitted to reduce the degree of brake application for a chosen reduction in brake pipe pressure would be less than intended. Further such reduction in control reservoir pressure in chamber 41 would delay obtaining sufficient differential between such pressure and brake pipe pressure in chamber 48 to move the slide valves 38, 40 to application position and thus undesirably slow down obtaining an application of brakes throughout a train. According to the invention, however, the control reservoir pressure in chamber 41 is prevented from reducing by downward movement of diaphragm 32 substantially below that initially provided, by the provision of the communication between the supply reservoir 3 and control reservoir 5 controlled by check valve 63. As above described, the check valve 63 controls a communication of large flow capacity and the force of seating spring 66 on said check valve is the very minimum necessary to ensure such seating upon substantial equalization of the supply and control reservoir pressures acting on opposite sides of the check valve. With this arrangement, as the diaphragm pile moves downwardly in response to a reduction in brake pipe pressure in chamber 48 and tends to reduce the pressure of fluid in chamber 41 and control reservoir 5, the check valve 63 will open as soon as the control reservoir pressure acting in check valve chamber 64 is slightly reduced (for example one-half pound) below that in the supply reservoir 3 acting in chamber 51 whereupon fluid under pressure will rapidly flow from the relatively large supply reservoir 3 to the small control reservoir 5 and diaphragm chamber 41 to maintain the pressures therein equal substantially to that initially present and it will be noted that this will occur before the control valve device 31 obtains application position and thus while the supply reservoir 3 is still charged to full pressure. By thus maintaining the pressure in chamber 41 substantially equal to that intended upon downward movement of the diaphragm pile, an application of brakes will not be delayed so that a train may be promptly brought under control.

When fluid under pressure is supplied from the supply reservoir 3 to the brake cylinder device 4 to apply the brakes it will be noted that the check valve 63 will be seated by spring 66 to hold the pressure in the control reservoir 5 against back flow to the supply reservoir 3 as the pressure in the latter becomes reduced below that in said control reservoir 5 by the supply to the brake cylinder device 4.

When the pressure obtained in the brake cylinder device 4 is increased in accordance with the reduction in brake pipe pressure the diaphragm pile will shift the auxiliary slide valve 40 to application lap position to limit the degree of brake application as hereinbefore described, such movement of diaphragm 32 reducing the volume of chamber 41 and thereby causing some slight increase in pressure therein requiring a proportionate increase in brake cylinder pressure in chamber 47 to obtain lap position. This is permissible however as long as prompt response of the diaphragm pile to provide the application of brakes is obtained.

In order to release an application of brakes, the pressure of fluid is restored in the brake pipe and thereby in chamber 48 and when increased in said chamber sufficiently to overcome the opposing control reservoir pressure in chamber 41 the diaphragm pile will return to the position in which it is shown in the drawing in which the supply reservoir 3 will be recharged with fluid under pressure by flow through choke 74 only and the fluid under pressure will be released from the brake cylinder device 4 to release the brakes.

If it is desired to graduate or limit the release of brakes then only partial restoration of pressure in brake pipe 2 and chamber 48 will be effected. If such be the case, then the pressure of fluid in the brake cylinder device 4 and diaphragm chamber 47 will reduce only until such reduction in pressure on diaphragm 34 slightly overbalances the increased brake pipe pressure in chamber 48 on diaphragm 35 whereupon control reservoir pressure in chamber 41 acting on diaphragm 32 will move the auxiliary slide valve 40 relative to the main slide valve 38 until the upper shoulder 39 on stem means 36 engages the adjacent end of the main slide valve 38. In this position of the auxiliary slide valve 40 communication will be closed between ports 86 and 88 to prevent further release of fluid under pressure from the brake cylinder device thereby limiting the release of brakes according to the increase in pressure in brake pipe 2. In this manner, by successive increases in brake pipe pressure, the pressure of fluid in the brake cylinder device may be graduated off in proportionate steps until finally when the brake pipe pressure is restored substantially to normal spring 85 will hold the diaphragm pile and slide valves 38, 40 in their normal or brake release position in which a complete release of brakes will occur and complete charging of the supply reservoir 3 will also result, in the manner above described.

If the pressure in the supply reservoir 3 becomes reduced while an application of brakes is in effect to substantially that in the brake pipe, or when, in effecting a release of brakes, the brake pipe pressure becomes increased to substantially that in the supply reservoir 3, spring 17 will return the parts of the quick service valve device 7 to the position in which they are shown in the drawing and in which diaphragm chamber 27 in the charging valve device 8 will be vented as previously described. The parts of the charging valve device 8 will however remain in their left-hand position lapping passages 70, 77 and 80 to hold the control reservoir 5 disconnected from the supply reservoir 3 and closing the supply reservoir charging communication via passages 77 and 84, due to pressure of fluid from the brake cylinder device 4 acting in chamber 29 on diaphragm 20 until such brake cylinder pressure becomes reduced to a pressure where the application of brakes is substantially fully released. When this occurs spring 26 will return the parts of the charging valve device to their normal position to reopen the communications just mentioned to permit final recharging of the supply reservoir 3 to occur via choke 76, in addition to choke 74 which alone is effective to control recharging of the supply reservoir until substantial full release of a brake application is obtained, and to also permit equalization of pressure of fluid in the control reservoir 5 with that in the supply reservoir 3.

It is to be noted that since the pressure of fluid in the control reservoir 5 is maintained by flow from the supply reservoir 3 past the check valve 63 upon movement of the diaphragm 32 downward in effecting an application of brakes, the pressure in chamber 41 and control reservoir 5 will increase to a degree greater than normal by displacement of diaphragm 32 upon upward movement to effect a release of brakes. This is of secondary importance as compared to obtaining prompt response of the diaphragm pile in effecting an application of brakes as above described, and, as will be apparent, will delay initiating a release of brakes until the pressure in the brake pipe is increased sufficiently to overcome the increased control reservoir pressure in chamber 41. When a substantial full release of pressure of fluid from the brake cylinder device is obtained however, it is desirable that the pressure of fluid in the control reservoir 5 and diaphragm chamber 41 equalize with brake pipe pressure in order to avoid the possibility of the diaphragm pile assuming the release lap position closing communication between ports 86 and 88 and holding some fluid under pressure in the brake cylinder device 4 and also to ensure that the control reservoir 5 will be charged to normal brake pipe pressure, which may vary from time to time, at the time of initiating an application of brakes. This result is obtained by the charging valve device 8 which upon return to normal position permits dissipation of excess fluid in the control reservoir 5 back through choke 69 to the brake pipe.

By manual operation of lever 61, the check valve 50 may be opened to vent only the brake cylinder device 4 or upon further movement the check valve 49 may also be opened to also release fluid under pressure from the supply reservoir 3, while upon still further movement, the check valve 63 will also be opened to additionally vent the control reservoir 5, under conditions where such is desirable.

*Summary*

It will now be seen that I have provided means to compensate for reduction in pressure in the control reservoir of a brake equipment of the type above described, incident to displacement of the control reservoir diaphragm in effecting an application of brakes and to equalize the pressure in the control reservoir with the normal pressure in the brake pipe upon a subsequent release of brakes, said means constituting a large capacity, lightly spring biased check valve which is also operative manually to vent said reservoir when such is desired.

Having now described my invention, what I claim as new and desire to secure by Letters Patent, is:

1. In a fluid pressure brake apparatus, in combination, a brake pipe, brake control means operable by fluid under pressure to effect application of brakes and upon release of such fluid under pressure a release of brakes, a control reservoir, a supply reservoir, movable abutment means subject to pressure in said control reservoir acting in opposition to pressure in said brake pipe and said brake control means and operative upon a reduction in brake pipe pressure relative to pressure in said control reservoir to a brake application position for supplying fluid under pressure from said supply reservoir to said brake control means and operative upon an increase in brake pipe pressure relative to pressure in said control reservoir to a brake release position for releasing fluid under pressure from said brake control means; means operative upon substantial complete release of fluid under pressure from said brake control means to open said reservoirs to said brake pipe for equalizing pressures of fluid therein and responsive to initiating a reduction in brake pipe pressure to isolate said reservoirs from each other and from said brake pipe, a communication for conveying fluid under pressure from said supply reservoir to said control reservoir, and a check valve in said communication for preventing flow of fluid under pressure from said control reservoir to said supply reservoir.

2. In a fluid pressure brake apparatus, in combination, a brake pipe, brake control means operable by fluid under pressure to effect application of brakes and upon release of such fluid under pressure a release of brakes, a control reservoir, a supply reservoir, movable abutment means subject to pressure in said control reservoir acting in opposition to pressure in said brake pipe and said brake control means and operative upon a reduction in brake pipe pressure relative to pressure in said control reservoir to a brake application position for supplying fluid under pressure from said supply reservoir to said brake control means and operative upon an increase in brake pipe pressure relative to pressure in said control reservoir to a brake release position for releasing fluid under pressure from said brake control means, charging valve means operative in response to substantial complete release of fluid under pressure from said brake control means to open said reservoirs to said brake pipe for equalizing pressures of fluid therein, a quick service valve device operative in response to a reduction in brake pipe pressure to effect a quick service reduction in brake pipe pressure and to effect operation of said charging valve means to isolate said reservoirs from each other and from said brake pipe, a communication connecting said reservoirs to permit flow of fluid under pressure from said supply reservoir to said control reservoir, and a check valve in said communication for preventing flow of fluid under pressure from said control reservoir to said supply reservoir.

3. In a fluid pressure brake apparatus, in combination, a brake pipe, brake control means operative by fluid under pressure to effect application of brakes and operative in response to release of fluid under pressure to release said application of brakes, a control reservoir, a supply reservoir, charging valve means operative upon release of fluid under pressure from a first chamber and substantial complete release of fluid under pressure from a second chamber, which is open to said brake control means, to open said reservoirs to said brake pipe for equalizing pressures of fluid therein and operative by pressure of fluid in said first chamber and a pressure in said second chamber exceeding substantial complete release of fluid under pressure therefrom to isolate said reservoirs from each other and said brake pipe, quick service means controlled by pressure in said brake pipe opposing pressure in said supply reservoir and responsive to a reduction in brake pipe pressure relative to pressure in said supply reservoir to supply fluid under pressure to said first chamber and operative upon substantial equalization of brake pipe pressure with that in said supply reservoir to vent said second chamber, a communication connecting said reservoirs providing for flow of fluid under pressure in the direction from said supply reservoir to said control reservoir, a check valve in said communication for preventing reverse flow of fluid under pressure therethrough, and movable abutment means subject to pressure of fluid in said control reservoir acting in opposition to pressure of fluid in said brake pipe and in said brake control means operative upon a reduction in brake pipe pressure relative to pressure in said control reservoir to supply fluid under pressure to said brake control means and operative upon an increase in brake pipe pressure relative to pressure of fluid in said control reservoir to release fluid under pressure from said brake control means.

4. In a fluid pressure brake apparatus, in combination, a brake pipe, a control reservoir, a supply reservoir, brake control means operable by fluid under pressure to effect an application of brakes and upon release of fluid under pressure a release of brakes, movable abutment means operable by pressure of fluid in said control reservoir upon a reduction in pressure in said brake pipe relative to pressure in said control reservoir to supply fluid under pressure to said brake control means and operative upon an increase in brake pipe pressure relative to pressure of fluid in said control reservoir to release fluid under pressure from said brake control means, means operative upon a reduction in brake pipe pressure to isolate said reservoirs from each other and from said brake pipe and to maintain such isolation until substantial complete release of fluid under pressure from said brake control means and to then open said reservoirs to said brake pipe to permit equalization of pressures of fluid therein, a passageway providing for flow of fluid under pressure from said supply reservoir to said control reservoir, a first check valve in said passageway for normally preventing reverse flow of fluid under pressure therethrough, a second check valve controlling a vent from said supply reservoir, and manual means for opening both of said check valves.

5. In a fluid pressure brake apparatus, in combination, a brake pipe, a control reservoir, a supply reservoir, brake control means operable by fluid under pressure to effect an application of brakes and upon release of fluid under pressure a release of brakes, movable abutment means operable by pressure of fluid in said control reservoir upon a reduction in pressure in said brake pipe relative to pressure in said control reservoir to supply fluid under pressure to said brake control means and operative upon an increase in brake pipe pressure relative to pressure of fluid in said control reservoir to release fluid under pressure from said brake control means, means operative upon a reduction in brake pipe pressure to isolate said reservoirs from each other and from said brake pipe and to maintain such isolation until substantial complete release of fluid under pressure from said brake control means and to then open said reservoirs to said brake pipe to permit equalization of pressures of fluid therein, a passageway providing for flow of fluid under pressure from said supply reservoir to said control reservoir, a first check valve in said passageway for normally preventing reverse flow of fluid under pressure therethrough, a second check valve controlling a vent from said supply reservoir, manual means operative upon a certain movement for opening said second check valve, and means for opening said first check valve upon greater movement of said manual means.

6. In a fluid pressure brake apparatus, in combination, a brake pipe, a control reservoir, a supply reservoir, brake control means operable by fluid under pressure to effect an application of brakes and upon release of fluid under pressure a release of brakes, movable abutment means operable by pressure of fluid in said control reservoir upon a reduction in pressure in said brake pipe relative to pressure in said control reservoir to supply fluid under pressure to said brake control means and operative upon an increase in brake pipe pressure relative to pressure of fluid in said control reservoir to release fluid under pressure from said brake control means, means operative upon a reduction in brake pipe pressure to isolate said reservoirs from each other and from said brake pipe and to maintain such isolation until substantial complete release of fluid under pressure from said brake control means and to then open said reservoirs to said brake pipe to permit equalization of pressures of fluid therein, a passageway providing for flow of fluid under pressure from said supply reservoir to said control reservoir, a first check valve in said passageway for normally preventing reverse flow of fluid under pressure therethrough, a second check valve controlling a vent from said supply reservoir, manual means for opening said second check valve, and means operative by said second check valve after opening thereof to open said first check valve.

7. In a fluid pressure brake apparatus, in combination, a brake pipe, a control reservoir, a supply reservoir, brake control means operable by fluid under pressure to effect an application of brakes and upon release of fluid under pressure a release of brakes, movable abutment means operable by pressure of fluid in said control reservoir upon a reduction in pressure in said brake pipe relative to pressure in said control reservoir to supply fluid under pressure to said brake control means and operative upon an increase in brake pipe pressure relative to pressure of fluid in said control reservoir to release fluid under pressure from said brake control means, means operative upon a reduction in brake pipe pressure to isolate said reservoirs from each other and from said brake pipe and to maintain such isolation until substantial complete release of fluid under pressure from said brake control means and to then open said reservoirs to said brake pipe to permit equalization of pressures of fluid therein, a passageway providing for flow of fluid under pressure from said supply reservoir to said control reservoir, a first check valve in said passageway for normally preventing reverse flow of fluid under pressure therethrough, a second check valve controlling a vent from said supply reservoir, a third check valve controlling a vent from said brake control means, and means operable manually for opening all of said check valves.

8. In a fluid pressure brake apparatus, in combination, a brake pipe, a control reservoir, a supply reservoir, brake control means operable by fluid under pressure to effect an application of brakes and upon release of fluid under pressure a release of brakes, movable abutment means operable by pressure of fluid in said control reservoir upon a reduction in pressure in said brake pipe relative to pressure in said control reservoir to supply fluid under pressure to said brake control means and operative upon an increase in brake pipe pressure relative to pressure of fluid in said control reservoir to release fluid under pressure from said brake control means, means operative upon a reduction in brake pipe pressure to isolate said reservoirs from each other and from said brake pipe and to maintain such isolation until substantial complete release of fluid under pressure from said brake control means and to then open said reservoirs to said brake pipe to permit equalization of pressures of fluid therein, a passageway providing for flow of fluid under pressure from said supply reservoir to said control reservoir, a first check valve in said passageway for normally preventing reverse flow of fluid under pressure therethrough, a second check valve controlling a vent from said supply reservoir, a third check valve controlling a vent from said brake control means, and means including a manually operative lever for successively opening said third, second and first check valves in the order named.

EARLE S. COOK.

References Cited in the file of this patent

UNITED STATES PATENTS

| Number | Name | Date |
|---|---|---|
| 1,936,966 | Kadantzeff | Nov. 28, 1933 |
| 2,009,836 | Chevillot | July 30, 1935 |
| 2,039,703 | Chevillot | May 5, 1936 |
| 2,376,680 | Gallusser | May 22, 1945 |